US009563855B2

(12) United States Patent
Yang et al.

(10) Patent No.: US 9,563,855 B2
(45) Date of Patent: Feb. 7, 2017

(54) USING A GENERIC CLASSIFIER TO TRAIN A PERSONALIZED CLASSIFIER FOR WEARABLE DEVICES

(71) Applicant: Intel Corporation, Santa Clara, CA (US)

(72) Inventors: Xue Yang, Ann Arbor, CA (US); Lakshman Krishnamurthy, Portland, OR (US); Lama Nachman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 14/318,555

(22) Filed: Jun. 27, 2014

(65) Prior Publication Data
US 2015/0379421 A1    Dec. 31, 2015

(51) Int. Cl.
*G06N 99/00* (2010.01)
*G06N 5/04* (2006.01)

(52) U.S. Cl.
CPC .................. *G06N 99/005* (2013.01)

(58) Field of Classification Search
CPC ........ G06N 99/00; G06N 99/005; G06N 5/02; G06N 5/022; G06N 5/04
USPC ...................................... 706/11–12
See application file for complete search history.

(56) References Cited

U.S. PATENT DOCUMENTS

| 5,487,133 A  * | 1/1996 | Park ............... G06K 9/6215 706/20 |
| 6,901,398 B1 * | 5/2005 | Horvitz ............ G06Q 10/107 707/694 |
| 8,706,656 B1 | 4/2014 | Lin et al. |
| 2009/0018980 A1 | 1/2009 | Zhang et al. |
| 2009/0326339 A1 | 12/2009 | Horvitz |
| 2010/0169781 A1* | 7/2010 | Graumann ......... G06F 3/011 715/727 |
| 2012/0059780 A1* | 3/2012 | Kononen .......... H04M 1/72522 706/14 |
| 2014/0244209 A1* | 8/2014 | Lee .................... G06K 9/00536 702/150 |

(Continued)

FOREIGN PATENT DOCUMENTS

EP    2629242 A1    8/2013

OTHER PUBLICATIONS

Nachman L. et al., "Jog Falls: A Pervasive Healthcare Platform for Diabetes Management", Pervasive 2010, LNCS 6030, pp. 94-111, 2010.*

(Continued)

*Primary Examiner* — Stanley K Hill
*Assistant Examiner* — Dave Misir
(74) *Attorney, Agent, or Firm* — Jordan IP Law, LLC

(57) ABSTRACT

Systems and methods may provide for using one or more generic classifiers to generate self-training data based on a first plurality of events associated with a device, and training a personal classifier based on the self-training data. Additionally, the one or more generic classifiers and the personal classifier may be used to generate validation data based on a second plurality of events associated with the device. In one example, the personal classifier is substituted for the one or more generic classifiers if the validation data indicates that the personal classifier satisfies a confidence condition relative to the one or more generic classifiers.

20 Claims, 3 Drawing Sheets

(56) References Cited

U.S. PATENT DOCUMENTS

2015/0170053 A1* 6/2015 Miao .................. G06N 99/005
706/12
2015/0242760 A1* 8/2015 Miao .................. G06N 99/005
706/12

OTHER PUBLICATIONS

Kaghyan S. et al., "Human Movement Activity Classification Approaches that use Wearable Sensors and Mobile Devices", Multimedia Content and Mobile Devices, edited by David Akopian, et al., Proc. of SPIE-IS&T Electronic Imaging, SPIE vol. 8667, 86670O, 2013.*
Shoaib M. et al., "Fusion of Smartphone Motion Sensors for Physical Activity Recognition", Sensors, Jun. 10, 2014, 14, pp. 10146-10176.*
Patel S. et al., "A review of wearable sensors and systems with application in rehabilitation", Journal of NeuroEngineering and Rehabilitation, 2012.*
International Search Report and Written Opinion for International Patent Application No. PCT/US2015/036886, mailed Sep. 11, 2015, 11 pages.

* cited by examiner

USING A GENERIC CLASSIFIER TO TRAIN A PERSONALIZED CLASSIFIER FOR WEARABLE DEVICES

TECHNICAL FIELD

Embodiments generally relate to classifiers. More particularly, embodiments relate to using a generic classifier to train a personalized classifier for devices such as wearable devices.

BACKGROUND

A main source of complexity and/or difficulty in performing event categorization tasks (e.g., physical activity recognition, gesture recognition, etc.) may result from large variations among sample data belonging to the same category. Such data variations may be due to individual differences (e.g., different people walk differently) and/or sensing variations (e.g., phone in the hand versus phone in the pocket of the same person detecting different signal patterns for the same walking activity).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
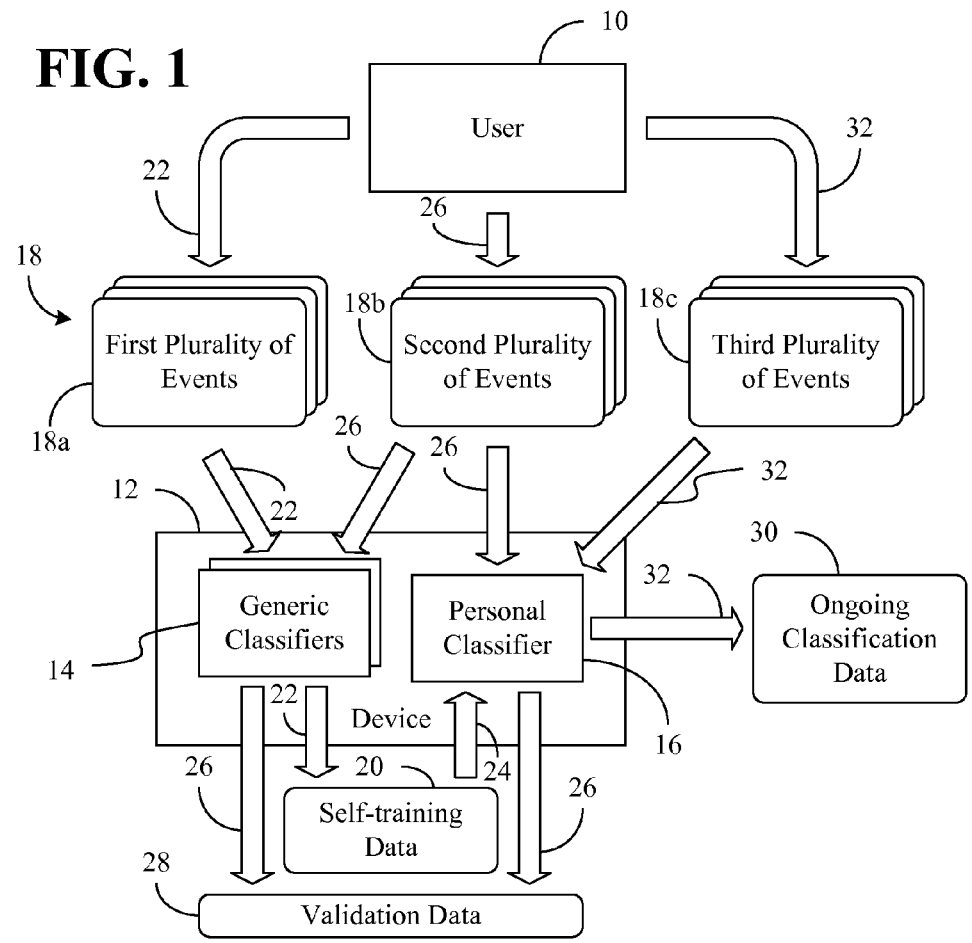
FIG. 1 is a block diagram of an example of a classification approach according to an embodiment.

Turning now to FIG. 1, a classification approach is shown in which a user 10 interacts with a device 12 such as, for example, a wearable device (e.g., electronic jewelry, clothing, footwear, eyewear, headwear, etc.), notebook computer, tablet computer, convertible tablet, personal digital assistant (PDA), mobile Internet device (MID), and so forth. The interaction between the user 10 and the device 12 may take the form of, for example, gestures (e.g., hand, head and/or body gestures) made by the user 10 and detected by a camera, touch screen (e.g., SWYPE data entry), accelerometer, gyroscope, etc., of the device 12, or other physical activity (e.g., walking) conducted by the user 10 while in contact with the device 12. Those interactions may be detected as events 18 (18a-18c) that may be automatically categorized/classified by the device 12 and used to perform other operations such as, for example, cursor movements, application launches, networking communications, and so forth, in real-time.

The illustrated device 12 includes one or more generic classifiers 14 and a personal classifier 16. In general, the generic classifiers 14 may be software solutions that are trained offline for a plurality of individuals (e.g., a large population containing different demographics and/or types of individuals) and may therefore not be tailored to the behavior, patterns and/or movement of the particular user 10. In the illustrated example, the generic classifiers 14 are used online (e.g., "on the fly"), via arrows 22, to generate self-training data 20 based on a first plurality of events 18a associated with the device 12. Additionally, the personal classifier 16 may be trained online, via arrow 24 based on the self-training data generated by the generic classifiers 14.

Because the illustrated self-training data 20 results from interactions conducted only by the user 10, once trained the personal classifier 16 may be tailored to the behavior, patterns, and/or movement of the user 10 in particular (e.g., and not the general population at large). Accordingly, the personal classifier 16 may be highly accurate in classifying events associated with the interactions conducted by the user 10. Indeed, if the device 12 is a wearable device such as, for example, a watch or eyewear, the accuracy of the personal classifier 16 may be even greater because wearable devices may typically be attached to the body in predictable ways. Therefore, given the intended usage of the device 12, the placement of the device 12 may have negligible variability with respect to the particular user 10.

Moreover, the personal classifier 16 may be implemented as a hardware solution (e.g., programmable pattern recognition neural network) having an accelerated responsiveness that is suitable for real-time applications. For example, one such hardware solution might include a silicon implementation of an associative memory having an array of neurons, wherein each neuron stores an n-dimensional reference feature vector. The classification may be done by mapping event data to neuron reference data so that each neuron describes part of a decision space. When training such a solution, a set of neurons may be defined given the training data so that the entire decision space is represented by all neurons. Given the training data relevant to a single user/individual, the set of neurons to represent the decision space can be reasonably small, which may in turn reduce the memory space, die size, and power requirements of the hardware solution. Thus, the cost impact, power consumption and complexity of such a hardware solution may be minimal because the illustrated personal classifier 16 only handles the events corresponding to a single user 10 (e.g., rather than a large population). The generation of the self-training data 20 and the training of the personal classifier 16 based on the self-training data 20 may be considered a "self-training stage" of the device 12.

During a "validation stage" of the device 12, the generic classifiers 14 and the personal classifier 16 may be used online, via arrows 26, to generate validation data 28 based on a second plurality of events 18b associated with the device 12. If the validation data 28 indicates that the personal classifier 16 satisfies a confidence condition relative to the generic classifiers 14, then the device 12 may automatically substitute the personal classifier 16 for the generic classifiers 14 when generating, via arrows 32, ongoing classification data 30 based on a third plurality of events 18c. As will be discussed in greater detail below, the confidence condition may include an agreement threshold between the generic classifiers 14 and the personal classifier 16 being reached and a validation instance threshold being reached. Moreover, the device 12 may also conduct periodic verifications that the confidence condition is satisfied and, if any of the periodic verifications are unsuccessful, re-train the personal classifier 16.

Figure 2:
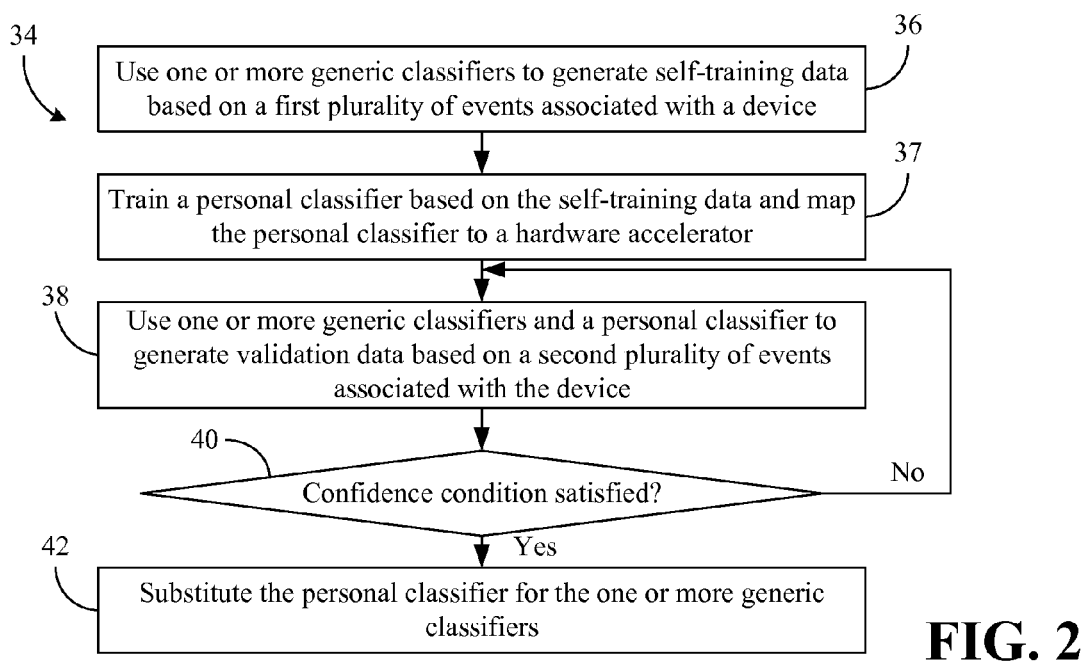
FIG. 2 is a flowchart of an example of a method of operating a device according to an embodiment.

Turning now to FIG. 2, a method 34 of operating a device such as, for example, the device 12 (FIG. 1), is shown. The method 34 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 34 may be written in any combination of one or more programming languages, including an object oriented programming language such as Java, Smalltalk, C++ or the like and conventional procedural programming languages, such as the "C" programming language or similar programming languages.

Illustrated processing block 36 provides for using one or more generic classifiers to generate self-training data based on a first plurality of events associated with the device. Block 37 may train a personal classifier based on the self-training data. Block 37 may be conducted online either on the device or remotely (e.g., on a cloud computing infrastructure, with the training results being returned to the device in real-time). Thus, block 37 might involve programming a silicon-based pattern recognition neural network (e.g., mapping the personal classifier to a hardware accelerator/classification engine) with a set of neurons reflecting the self-training data, wherein the formulation of the set of neurons for personal classifier may take place either on the device or on a cloud computing infrastructure (e.g., the device transmits the self-training data to the cloud and receives the neuron programming parameters from the cloud). Accordingly, the personal classifier may be trained online for a single individual, whereas each of the one or more generic classifiers may be trained offline for a plurality of individuals.

Although the personal classifier is mapped to a hardware accelerator in the illustrated example, the generic classifier might not use a hardware accelerator in order to be cost effective. For the personalized classifier, on the other hand, the number of neurons may be small, and therefore reasonable for use with a hardware accelerator.

The one or more generic classifiers and a personal classifier may be used at block 38 to generate validation data based on a second plurality of events associated with the device, wherein a determination may be made at block 40 as to whether a confidence condition is satisfied. As already noted, the confidence condition may include, for example, an agreement threshold between the one or more generic classifiers and the personal classifier being reached, a validation instance threshold being reached, and so forth. If the validation data indicates that the personal classifier satisfies the confidence condition relative to the one or more generic classifiers, illustrated block 42 substitutes the personal classifier for the one or more generic classifiers. Substituting the personal classifier for the one or more generic classifiers may result in only the personal classifier being used to automatically generate ongoing classification data based on a third plurality of events, wherein the ongoing classification data may in turn be used to perform other real-time operations such as, for example, cursor movements, application launches, networking communications, and so forth.

Figure 3:
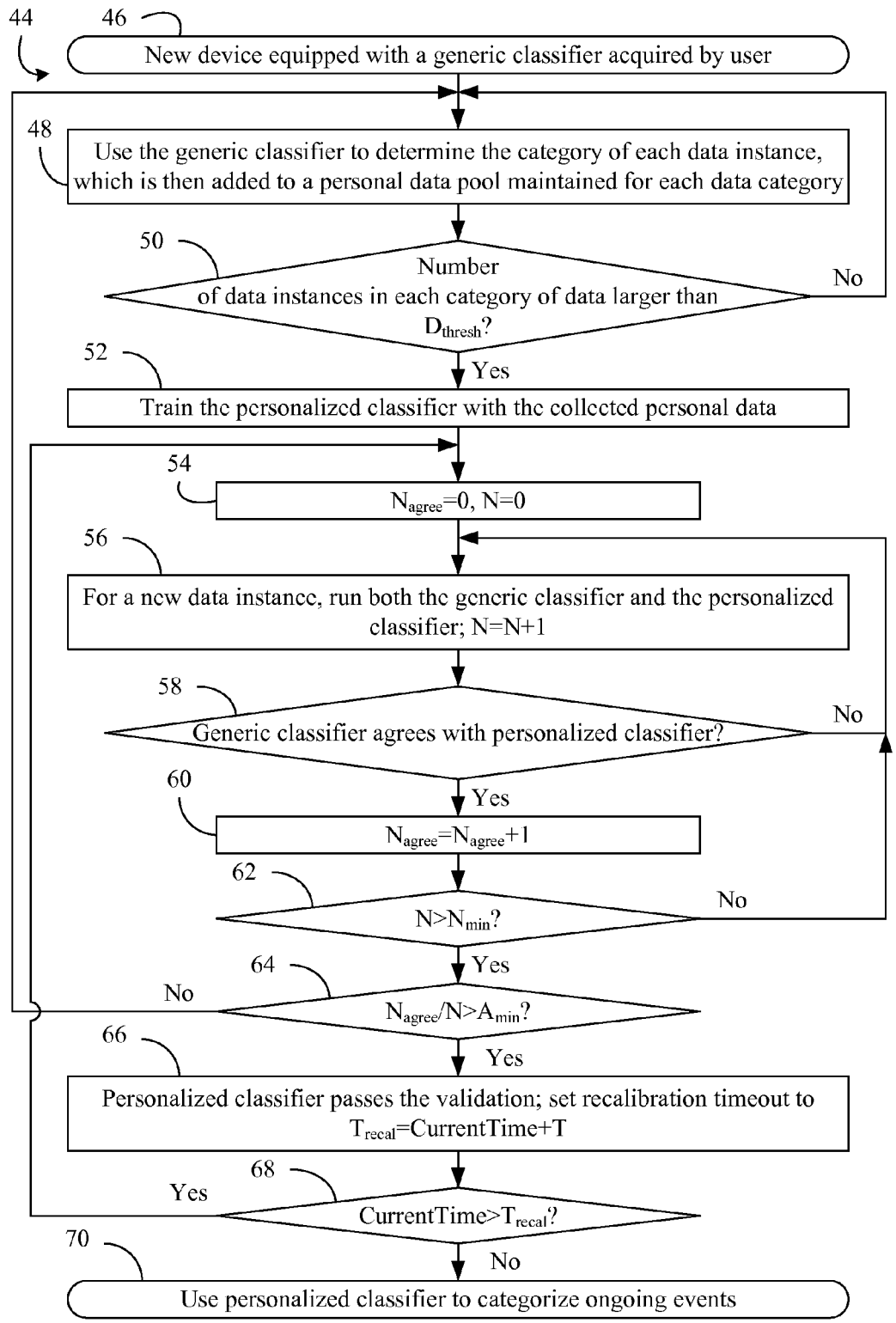
FIG. 3 is a flowchart of a more detailed example of a method of operating a device according to an embodiment.

FIG. 3 shows a more detailed method 44 of operating a device such as, for example, the device 12 (FIG. 1). The method 44 may also be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. In starting block 46, a new device (e.g., "out-of-box") equipped with a generic classifier may be acquired by a user. The generic classifier may be used at block 48 to determine the category of each data instance (e.g., categorize each event), which may then be added to a personal data pool maintained for each data category.

Thus, if the device is, for example, a wristwatch containing motion sensing technology (e.g., one or more accelerometers) configured to detect three different hand gestures, block 48 might involve creating and maintaining a personal data pool for each category of hand gesture. Accordingly, each time a particular hand gesture is detected, the underlying event data (e.g., accelerometer data) corresponding to that event may be added to the personal data pool corresponding to the hand gesture in question. Illustrated block 50 determines whether the number of data instances/events in each category of data is larger than a particular threshold ("$D_{thresh}$"). If not, the method 44 may repeat block 48. If so, the personalized classifier may be trained with the collected personal data at block 52 and the self-training stage may complete.

Illustrated block 54 begins the validation stage by initializing one or more variables such as, for example, the number of instances/events (e.g., N=0) and the number of instances/events for which the generic classifier and the personal classifier agree (e.g., $N_{agree}$=0). For a new data instance, block 56 may run both the generic classifier and the personalized classifier, and increment the number of instances/events (e.g., N=N+1). Additionally, illustrated block 58 determines whether the generic classifier agrees with the personalized classifier (e.g., both classifiers categorize the event as the same gesture). If not, the illustrated method 44 may repeat block 56. If so, the number of instances/events for which the generic classifier and the personal classifier agree may be incremented (e.g., $N_{agree}=N_{agree}+1$) at block 60.

Additionally, a determination may be made at block 62 as to whether a validation instance threshold ("$N_{min}$") has been reached (e.g., $N>N_{min}$). If not, the illustrated method 44 may repeat block 56. If so, a determination may be made at block 64 as to whether an agreement threshold ("Amin" percentage) between the generic classifier and the personal classifier has been reached (e.g., $N_{agree}/N>A_{min}$). If not, the self-training of the personal classifier may be repeated by returning the process to block 48. Otherwise, the personal classifier has passed the validation stage and illustrated block 66 sets a recalibration timeout to a particular value (e.g., $T_{recal}$=CurrentTime+T). If it is determined at illustrated block 68 that the recalibration timeout has expired (e.g., CurrentTime>Trecal), a periodic verification that the confidence condition is satisfied may be conducted by returning the process to block 54 and the validation stage. If the recalibration timeout has not expired, termination block 70 may use the personalized classifier to categorize ongoing events online and in real-time.

Figure 4:
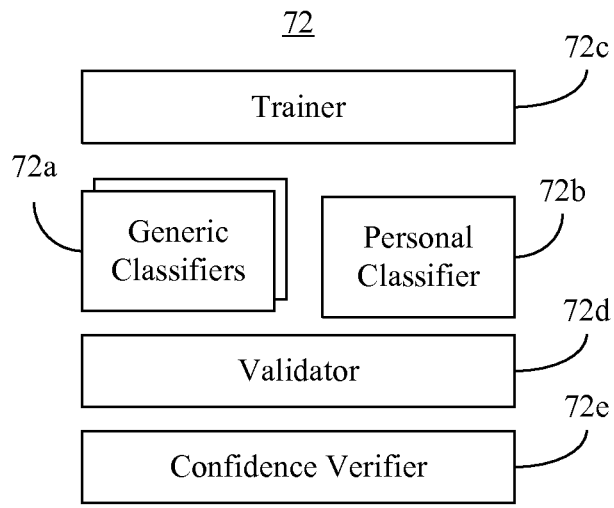
FIG. 4 is a block diagram of an example of a logic architecture according to an embodiment.

Turning now to FIG. 4, a logic architecture 72 (72a-72e) is shown. The architecture 72 may generally implement one or more aspects of a method such as, for example, the method 34 (FIG. 2) and/or the method 44 (FIG. 3), already discussed. Accordingly, the architecture 72 may be an apparatus readily incorporated into a device such as, for example, the device 12 (FIG. 1), already discussed. Thus, the architecture 72 may generally include one or more generic classifiers 72a and a personal classifier 72b. In the illustrated example, the one or more generic classifiers 72a generates self-training data based on a first plurality of events associated with the device, wherein a trainer 72c coupled to the personal classifier 72b may train the personal classifier based on the self-training data. The trainer, which may reside on the device, on a cloud computing infrastructure, and so forth, may also map the personal classifier to a hardware accelerator (e.g., programmable pattern recognition neural network) having an accelerated responsiveness that is suitable for real-time training and classifications.

Additionally, the one or more generic classifiers 72a and the personal classifier 72b may generate validation data based on a second plurality of events associated with the device. In the illustrated example, a validator 72d coupled to the one or more generic classifiers 72a and the personal classifier 72b substitutes the personal classifier 72b for the one or more generic classifiers 72a if the validation data indicates that the personal classifier 72b satisfies a confidence condition relative to the one or more generic classifiers 72a. As already noted, the confidence condition may include an agreement threshold between the one or more generic classifiers 72a and the personal classifier 72b being reached, a validation instance threshold being reached, and so forth. Thus, each of the one or more generic classifiers 72a may be trained offline for a plurality of individuals and the personal classifier 72b may be trained online for a single individual. In one example, the generic classifiers 72a are implemented in software with a relatively high level of complexity and the personal classifier 72b is implemented in hardware with a relatively low level of complexity due to the focus of the personal classifier 72b on a single individual.

The illustrated architecture 72 also includes a confidence verifier 72e to conduct a periodic verification that the confidence condition is satisfied. If the periodic verification is unsuccessful, the trainer 72c may re-train the personal classifier 72b.

Figure 5:
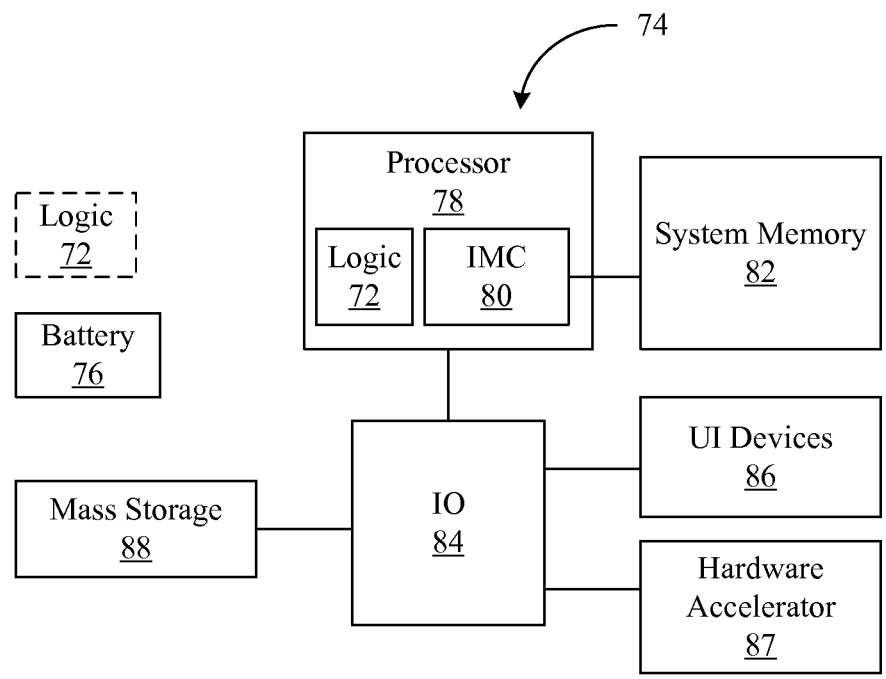
FIG. 5 is a block diagram of an example of a device according to an embodiment.

FIG. 5 shows a mobile device 74. The mobile device 74 may be part of a platform having computing functionality (e.g., PDA, notebook computer, tablet computer), communications functionality (e.g., wireless smart phone), imaging functionality, media playing functionality (e.g., smart television/TV), wearable functionality (e.g., watch, eyewear, headwear, footwear, jewelry) any combination thereof (e.g., MID). In the illustrated example, the device 74 includes a battery 76 to supply power to the device 74 and a processor 78 having an integrated memory controller (IMC) 80, which may communicate with system memory 82. The system memory 82 may include, for example, dynamic random access memory (DRAM) configured as one or more memory modules such as, for example, dual inline memory modules (DIMMs), small outline DIMMs (SODIMMs), etc.

The illustrated device 74 also includes a input output (10) module 84, sometimes referred to as a Southbridge of a chipset, that functions as a host device and may communicate with, for example, one or more user interface (UI) devices 86 (e.g., touch screens, displays, keypads, sensors) and mass storage 88 (e.g., hard disk drive/HDD, optical disk, flash memory, etc.). The illustrated processor 78 may execute the logic architecture 72 that is configured to use one or more generic classifiers to generate self-training data based on a first plurality of events associated with the device 74, use the one or more generic classifiers and a personal classifier to generate validation data based on a second plurality of events associated with the device 74, and automatically substitute the personal classifier for the one or more generic classifiers if the validation data indicates that the personal classifier satisfies a confidence condition relative to the one more generic classifiers, as already discussed. The logic architecture 72 may optionally be implemented external to the processor 78. Additionally, the processor 78 and the IO module 84 may be implemented together on the same semiconductor die as a system on chip (SoC).

Moreover, the illustrated device 74 may also include a hardware accelerator 87 (e.g., programmable pattern recognition neural network) having an accelerated responsiveness that is suitable for real-time training and classifications. For example, one such hardware solution might include a silicon implementation of an associative memory having an array of neurons, wherein each neuron stores an n-dimensional reference feature vector.

Additional Notes and Examples

Example 1 may include a wearable device comprising a battery to power the device, a user interface to detect a first plurality of events during a self-training stage of the wearable device and a second plurality of events during a validation stage of the wearable device, one or more generic classifiers to generate self-training data based on the first plurality of events, a personal classifier, wherein the one or more generic classifiers and the personal classifier are to generate validation data based on the second plurality of events, and a validator coupled to the one or more generic classifiers and the personal classifier, the validator to substitute the personal classifier for the one or more generic classifiers if the validation data indicates that the personal classifier satisfies a confidence condition relative to the one or more generic classifiers.

Example 2 may include the wearable device of Example 1, wherein each of the one or more generic classifiers is trained offline for a plurality of individuals and the personal classifier is to be trained online for a single individual.

Example 3 may include the wearable device of Example 1, wherein the confidence condition is to include an agreement threshold between the one or more generic classifiers and the personal classifier being reached.

Example 4 may include the wearable device of Example 3, wherein the confidence condition is to further include a validation instance threshold being reached.

Example 5 may include the wearable device of any one of Examples 1 to 4, further including a trainer coupled to the personal classifier, the trainer to train the personal classifier based on the self-training data.

Example 6 may include the wearable device of Example 5, further including a confidence verifier to conduct a periodic verification that the confidence condition is satisfied, wherein the trainer is to re-train the personal classifier if the periodic verification is unsuccessful.

Example 7 may include the wearable device of Example 5, further including a hardware accelerator, wherein the trainer is to map the personal classifier to the hardware accelerator.

Example 8 may include a method of operating a device, comprising using one or more generic classifiers to generate self-training data based on a first plurality of events associated with the device, using the one or more generic classifiers and a personal classifier to generate validation data based on a second plurality of events associated with the device, and substituting the personal classifier satisfies a confidence condition relative to the one or more generic classifiers.

Example 9 may include the method of Example 8, wherein each of the one or more generic classifiers is trained offline for a plurality of individuals and the personal classifier is trained online for a single individual.

Example 10 may include the method of Example 8, wherein the confidence condition includes an agreement threshold between the one or more generic classifiers and the personal classifier being reached.

Example 11 may include the method of Example 10, wherein the confidence condition further includes a validation instance threshold being reached.

Example 12 may include the method of any one of Examples 8 to 11, further including training the personal classifier based on the self-training data, and mapping the personal classifier to a hardware accelerator.

Example 13 may include the method of Example 12, further including conducting a periodic verification that the confidence condition is satisfied, and re-training the personal classifier if the periodic verification is unsuccessful.

Example 14 may include at least one computer readable storage medium comprising a set of instructions which, when executed by a computing device, cause the computing device to use one or more generic classifiers to generate self-training data based on a first plurality of events associated with the computing device, use the one or more generic classifiers and a personal classifier to generate validation data based on a second plurality of events associated with the device, and substitute the personal classifier for the one or more generic classifiers if the validation data indicates that the personal classifier satisfies a confidence condition relative to the one or more generic classifiers.

Example 15 may include the at least one computer readable storage medium of Example 14, wherein each of the one or more generic classifiers is to be trained offline for a plurality of individuals and the personal classifier is to be trained online for a single individual.

Example 16 may include the at least one computer readable storage medium of Example 14, wherein the confidence condition is to include an agreement threshold between the one or more generic classifiers and the personal classifier being reached.

Example 17 may include the at least one computer readable storage medium of Example 16, wherein the confidence condition is to further include a validation instance threshold being reached.

Example 18 may include the at least one computer readable storage medium of any one of Examples 14 to 17, wherein the instructions, when executed, cause the computing device to train the personal classifier based on the self-training data, and map the personal classifier to a hardware accelerator.

Example 19 may include the at least one computer readable storage medium of Example 17, wherein the instructions, when executed, cause the computing device to conduct a periodic verification that the confidence condition is satisfied, and re-train the personal classifier if the periodic verification is unsuccessful.

Example 20 may include an event categorization apparatus comprising one or more generic classifiers to generate self-training data based on a first plurality of events associated with a device, a personal classifier, wherein the one or more generic classifiers and the personal classifier are to generate validation data based on a second plurality of events associated with the device, and a validator coupled to the one or more generic classifiers and the personal classifier, the validator to substitute the personal classifier for the one or more generic classifiers if the validation data indicates that the personal classifier satisfies a confidence condition relative to the one or more generic classifiers.

Example 21 may include the apparatus of Example 20, wherein each of the one or more generic classifiers is trained offline for a plurality of individuals and the personal classifier is to be trained online for a single individual.

Example 22 may include the apparatus of Example 20, wherein the confidence condition is to include an agreement threshold between the one or more generic classifiers and the personal classifier being reached.

Example 23 may include the apparatus of Example 22, wherein the confidence condition is to further include a validation instance threshold being reached.

Example 24 may include the apparatus of any one of Examples 20 to 23, further including a trainer coupled to the personal classifier, the trainer to train the personal classifier based on the self-training data and map the personal classifier to a hardware accelerator.

Example 25 may include the apparatus of Example 24, further including a confidence verifier to conduct a periodic verification that the confidence condition is satisfied, wherein the trainer is to re-train the personal classifier if the periodic verification is unsuccessful.

Example 26 may include an event categorization apparatus comprising means for performing the method of any of Examples 8 to 13.

Thus, techniques described herein may enable a user of a device to start with complex software based generic classifiers, wherein a constrained hardware based personal classifier may play a larger role in categorizing events over a longer time span as the personal classifier learns the behavioral patterns of a particular individual. Such an approach may reduce data variations, which may in turn enable minimal features to be learned, less computation in feature extractions and easier classification tasks. Moreover, use of a hardware based personal classifier may result in fewer hardware components, smaller die size and improved power efficiency. Simply put, techniques described herein may enable longer battery life, higher accuracy due to better data separation between categories, and improved speed of recognition.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A wearable device comprising:
a battery to power the wearable device;
a user interface to detect a first plurality of events during a self-training stage of the wearable device and a second plurality of events during a validation stage of the wearable device;
one or more generic classifiers to generate self-training data based on the first plurality of events;
a personal classifier, wherein the one or more generic classifiers and the personal classifier are to generate validation data based on the second plurality of events;
a validator coupled to the one or more generic classifiers and the personal classifier, the validator to substitute the personal classifier for the one or more generic classifiers if the validation data indicates that the personal classifier satisfies a confidence condition relative to the one or more generic classifiers;
a trainer coupled to the personal classifier, the trainer to train the personal classifier based on the self-training data; and
a hardware accelerator, wherein the hardware accelerator is a silicon-based programmable pattern recognition neural network, wherein the trainer is to map the personal classifier to the hardware accelerator.

2. The wearable device of claim 1, wherein each of the one or more generic classifiers is trained offline for a plurality of individuals and the personal classifier is to be trained online for a single individual.

3. The wearable device of claim 1, wherein the confidence condition is to include an agreement threshold between the one or more generic classifiers and the personal classifier being reached.

4. The wearable device of claim 3, wherein the confidence condition is to further include a validation instance threshold being reached.

5. The wearable device of claim 1, further including a confidence verifier to conduct a periodic verification that the confidence condition is satisfied, wherein the trainer is to re-train the personal classifier if the periodic verification is unsuccessful.

6. A method of operating a device, comprising:
using one or more generic classifiers to generate self-training data based on a first plurality of events associated with the device;
using the one or more generic classifiers and a personal classifier to generate validation data based on a second plurality of events associated with the device;
substituting the personal classifier for the one or more generic classifiers if the validation data indicates that the personal classifier satisfies a confidence condition relative to the one or more generic classifiers;
training the personal classifier based on the self-training data; and
mapping the personal classifier to a silicon-based programmable pattern recognition neural network.

7. The method of claim 6, wherein each of the one or more generic classifiers is trained offline for a plurality of individuals and the personal classifier is trained online for a single individual.

8. The method of claim 6, wherein the confidence condition includes an agreement threshold between the one or more generic classifiers and the personal classifier being reached.

9. The method of claim 8, wherein the confidence condition further includes a validation instance threshold being reached.

10. The method of claim 6, further including:
conducting a periodic verification that the confidence condition is satisfied; and
re-training the personal classifier if the periodic verification is unsuccessful.

11. At least one computer readable non-transitory storage medium comprising a set of instructions which, when executed by a computing device, cause the computing device to:
use one or more generic classifiers to generate self-training data based on a first plurality of events associated with the computing device;
use the one or more generic classifiers and a personal classifier to generate validation data based on a second plurality of events associated with the device;
substitute the personal classifier for the one or more generic classifiers if the validation data indicates that the personal classifier satisfies a confidence condition relative to the one or more generic classifiers;
train the personal classifier based on the self-training data; and
map the personal classifier to a silicon-based programmable pattern recognition neural network.

12. The at least one computer readable storage medium of claim 11, wherein each of the one or more generic classifiers is to be trained offline for a plurality of individuals and the personal classifier is to be trained online for a single individual.

13. The at least one computer readable storage medium of claim 11, wherein the confidence condition is to include an agreement threshold between the one or more generic classifiers and the personal classifier being reached.

14. The at least one computer readable storage medium of claim 13, wherein the confidence condition is to further include a validation instance threshold being reached.

15. The at least one computer readable storage medium of claim 14, wherein the instructions, when executed, cause the computing device to:

conduct a periodic verification that the confidence condition is satisfied; and re-train the personal classifier if the periodic verification is unsuccessful.

16. An event categorization apparatus comprising:

a processor used by one or more generic classifiers, a personal classifier and a validation, wherein the one or more generic classifiers is to generate self-training data based on a first plurality of events associated with a device, wherein the one or more generic classifiers and the personal classifier are to generate validation data based on a second plurality of events associated with the device, wherein the validator is coupled to the one or more generic classifiers and the personal classifier, and wherein the validator is to substitute the personal classifier for the one or more generic classifiers if the validation data indicates that the personal classifier satisfies a confidence condition relative to the one or more generic classifiers; and a trainer coupled to the personal classifier, wherein the trainer is to train the personal classifier based on the self-training data and map the personal classifier to a silicon-based programmable pattern recognition neural network.

17. The apparatus of claim 16, wherein each of the one or more generic classifiers is trained offline for a plurality of individuals and the personal classifier is to be trained online for a single individual.

18. The apparatus of claim 16, wherein the confidence condition is to include an agreement threshold between the one or more generic classifiers and the personal classifier being reached.

19. The apparatus of claim 18, wherein the confidence condition is to further include a validation instance threshold being reached.

20. The apparatus of claim 16, further including a confidence verifier to conduct a periodic verification that the confidence condition is satisfied, wherein the trainer is to re-train the personal classifier if the periodic verification is unsuccessful.

* * * * *